US011599642B2

(12) United States Patent
Young et al.

(10) Patent No.: US 11,599,642 B2
(45) Date of Patent: Mar. 7, 2023

(54) SECURE BOOTING OF INFORMATION HANDLING SYSTEMS BASED ON VALIDATED HARDWARE

(71) Applicant: Dell Products, L.P., Round Rock, TX (US)

(72) Inventors: Jason Matthew Young, Round Rock, TX (US); Marshal F. Savage, Austin, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 185 days.

(21) Appl. No.: 17/138,045

(22) Filed: Dec. 30, 2020

(65) Prior Publication Data

US 2022/0207145 A1 Jun. 30, 2022

(51) Int. Cl.
| G06F 1/24 | (2006.01) |
| G06F 21/57 | (2013.01) |
| H04L 9/32 | (2006.01) |
| G06F 21/44 | (2013.01) |
| G06F 9/4401 | (2018.01) |

(52) U.S. Cl.
CPC ............ G06F 21/575 (2013.01); G06F 21/44 (2013.01); H04L 9/3263 (2013.01); *G06F 9/4401* (2013.01); *G06F 2221/033* (2013.01)

(58) Field of Classification Search
CPC .. G06F 21/575; G06F 21/44; G06F 2221/033; H04L 9/3263
USPC .......................................................... 713/2
See application file for complete search history.

(56) References Cited

U.S. PATENT DOCUMENTS

| 5,655,148 | A | * | 8/1997 | Richman | ............... | G06F 13/102 |
| | | | | | | 710/9 |
| 5,748,980 | A | * | 5/1998 | Lipe | ...................... | G06F 9/4411 |
| | | | | | | 710/104 |
| 5,787,246 | A | * | 7/1998 | Lichtman | .............. | G06F 9/4411 |
| | | | | | | 710/10 |
| 7,506,051 | B2 | * | 3/2009 | Becker | ............... | H04L 41/0853 |
| | | | | | | 709/224 |
| 8,479,292 | B1 | * | 7/2013 | Linhardt | ............. | H04L 63/1441 |
| | | | | | | 713/1 |
| 9,141,419 | B1 | * | 9/2015 | Yoder | .................... | G06F 9/4405 |
| 10,311,224 | B1 | * | 6/2019 | Farhan | .................. | H04L 9/3226 |

(Continued)

*Primary Examiner* — Volvick Derose
(74) *Attorney, Agent, or Firm* — Fogarty LLP

(57) ABSTRACT

Embodiments support secure booting of an IHS (Information Handling System) based on validation of the secure assembly and delivery of the IHS. A validation process of the IHS is initialized that delays further booting of the IHS until detected hardware components of the IHS are validated. An inventory certificate is retrieved that was uploaded to the IHS during factory provisioning of the IHS. The inventory certificate includes an inventory that identifies hardware components installed during factory assembly of the IHS. A collected inventory of detected hardware components of the IHS is compared against the inventory from the inventory certificate in order to validate the detected hardware components of the IHS as the same hardware components installed during factory assembly of the IHS. When the comparison validates the detected hardware components of the IHS as only including factory assembled hardware, further booting of the IHS is allowed.

20 Claims, 11 Drawing Sheets

(56) References Cited

U.S. PATENT DOCUMENTS

| | | | | |
|---|---|---|---|---|
| 2006/0248328 | A1* | 11/2006 | Iszlai | G06F 9/4416 |
| | | | | 713/2 |
| 2007/0061227 | A1* | 3/2007 | Gimpl | G06Q 10/087 |
| | | | | 705/28 |
| 2008/0269938 | A1* | 10/2008 | Meaney | G06Q 99/00 |
| | | | | 700/116 |
| 2014/0101467 | A1* | 4/2014 | Jubran | H04L 41/344 |
| | | | | 709/224 |
| 2014/0325196 | A1* | 10/2014 | Munger | G06F 9/4411 |
| | | | | 713/2 |
| 2015/0106608 | A1* | 4/2015 | Brundidge | G06F 1/26 |
| | | | | 713/2 |
| 2015/0244708 | A1* | 8/2015 | Ballard | H04L 63/0823 |
| | | | | 726/6 |
| 2016/0055560 | A1* | 2/2016 | McKelvey | G06Q 30/0267 |
| | | | | 705/26.61 |
| 2016/0364243 | A1* | 12/2016 | Puthillathe | G06F 9/4406 |
| 2019/0042707 | A1* | 2/2019 | Young | G06F 21/604 |
| 2019/0236279 | A1* | 8/2019 | Depew | G06F 9/44505 |
| 2020/0293694 | A1* | 9/2020 | Gonzalez Mendez | |
| | | | | G06F 21/575 |
| 2021/0073003 | A1* | 3/2021 | Jacquin | G06F 21/57 |
| 2022/0055171 | A1* | 2/2022 | Yang | B24B 3/36 |
| 2022/0066766 | A1* | 3/2022 | Mysore Shantamurthy | |
| | | | | G06F 8/65 |
| 2022/0067139 | A1* | 3/2022 | Rodriguez Bravo | |
| | | | | G06F 9/4406 |
| 2022/0207145 | A1* | 6/2022 | Young | H04L 9/3263 |

\* cited by examiner

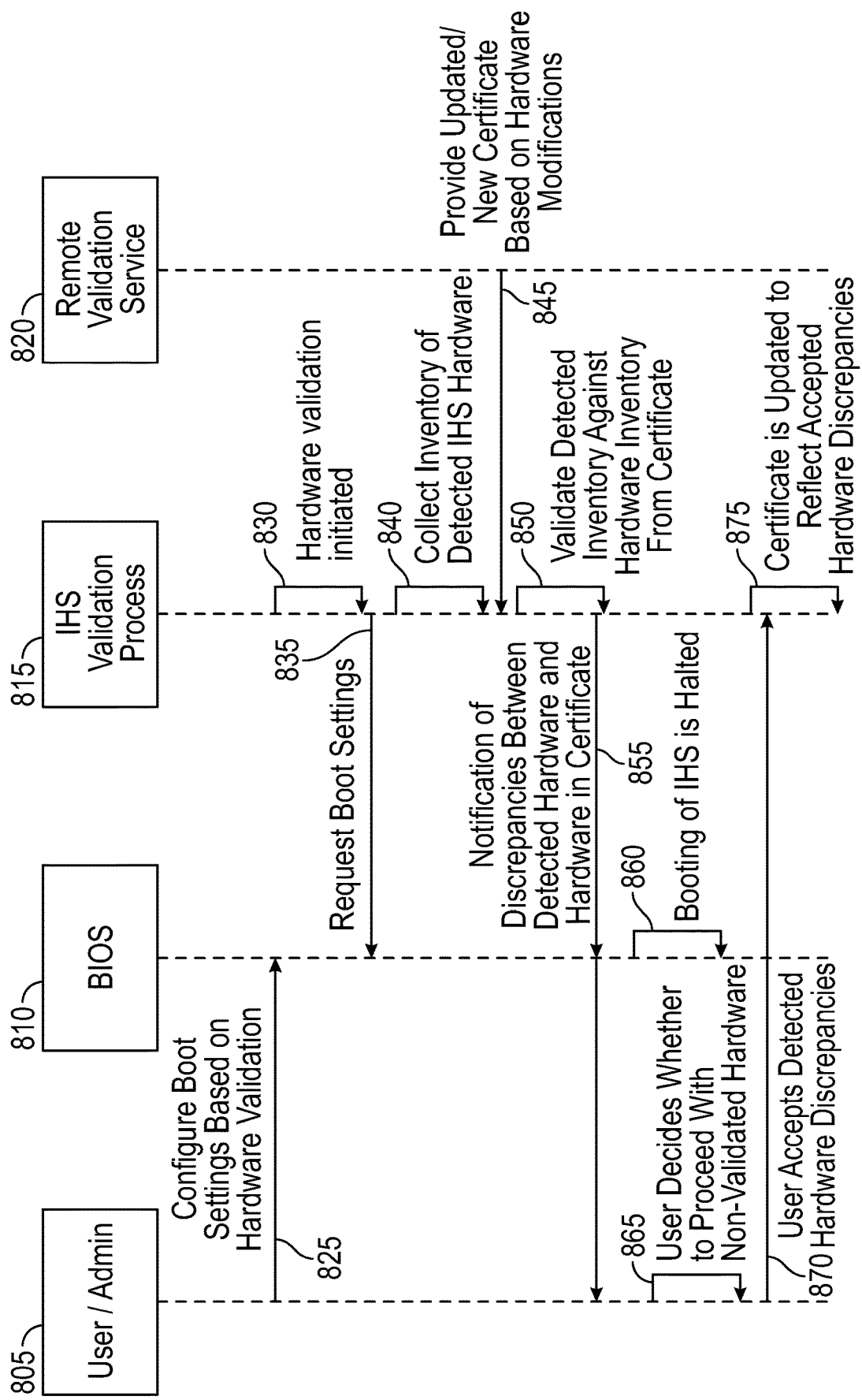

SECURE BOOTING OF INFORMATION HANDLING SYSTEMS BASED ON VALIDATED HARDWARE

FIELD

The present disclosure relates generally to Information Handling Systems (IHSs), and relates more particularly to IHS security.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHSs, such as mobile phones and tablets, are typically manufactured in large quantities and with few variations. For instance, for a particular model of mobile phone or tablet, hundreds of thousands of identical, or nearly identical, devices may be manufactured. Other types of IHSs, such as rack-mounted servers, are manufactured in much smaller quantities and are frequently manufactured and customized according to specifications provided by a specific customer that has contracted for the manufacture and delivery of the server. In such instances, a customer may specify various hardware and/or software customizations that configure the server to support specific functionality. For example, a customer may contract for manufacture and delivery of a server that includes security adaptations that will enable the server to securely process high volumes of financial transactions. However, such security adaptations may be circumvented by malicious actors by surreptitiously replacing factory installed hardware components of an IHS with compromised hardware components. To a certain extent, IHSs that are mass produced, such as tablets, may be similarly compromised by replacement of factory installed hardware components. Each time a hardware component on an IHS is replaced or a new hardware component is installed to an IHS, an opportunity is presented for a malicious actor to substitute a compromised hardware component for a genuine hardware component.

SUMMARY

Various embodiments provide methods for validating secure assembly and delivery of an IHS (Information Handling System). The methods may include: initializing a validation process of the IHS, wherein the validation process delays further booting of the IHS until detected hardware components of the IHS are validated; retrieving, by the validation process, an inventory certificate uploaded to the IHS during factory provisioning of the IHS, wherein the inventory certificate includes an inventory identifying a plurality of hardware components installed during factory assembly of the IHS; collecting, by the validation process, an inventory of the detected hardware components of the IHS; comparing the collected inventory of detected hardware components against the inventory from the inventory certificate in order to validate the detected hardware components of the IHS as the same hardware components installed during factory assembly of the IHS; and when the comparison validates the detected hardware components of the IHS, allowing further booting of the IHS.

In additional method embodiments, when the comparison does not validate the detected hardware components of the IHS, further comprising notifying a user of the IHS of the discrepancy between the detected hardware components of the IHS and the hardware components installed during factory assembly of the IHS. Additional method embodiments may further include, allowing the user to disable a detected hardware component of the IHS that is not validated. Additional method embodiments may further include allowing the user to authorize use of a detected hardware components of the IHS that is not validated. Additional method embodiments may further include updating the inventory certificate to identify the authorized hardware components as a hardware component validated by the user. In additional method embodiments, the inventory included in the inventory certificate further identifies a plurality of hardware components provided for installation in the IHS by a trusted entity. In additional method embodiments, the comparison further validates the detected hardware components of the IHS as the same hardware components installed during factory assembly of the IHS or as hardware components provided for installation in the IHS by a trusted entity. In additional method embodiments, the inventory certificate is uploaded to the IHS by a remote access controller of the IHS storing the inventory certificate to a persistent memory of the IHS.

Various additional embodiments provide IHSs that may include: a plurality of hardware components, wherein during factory provisioning of the IHS an inventory certificate is uploaded to the IHS that includes an inventory that identifies factory installed hardware components of the IHS, and wherein the plurality of hardware components comprise: one or more processors; and one or more memory devices coupled to the processors, the memory devices storing computer-readable instructions that, upon execution by the processors, cause a validation process of the IHS to: delay booting of an operating system of the IHS until the plurality of hardware components of the IHS are validated; compare the plurality of hardware components against the inventory from the inventory certificate in order to validate the plurality of hardware components of the IHS as the same hardware components installed during factory assembly of the IHS; and when the comparison validates the plurality of hardware components of the IHS, allow further booting of the operating system of the IHS.

In additional IHS embodiments, when the comparison does not validate the detected hardware components of the IHS execution of instructions by the processor further causes the validation process to notify a user of the IHS of the discrepancy between the plurality of hardware components of the IHS and the hardware components installed during factory assembly of the IHS. In additional IHS embodiments, execution of instructions by the processor further causes the validation process to allow the user to disable a hardware component of the IHS that is not validated. In additional IHS embodiments, execution of instructions by the processor further causes the validation process to allow the user to authorize use of a hardware component of the IHS that is not validated. In additional IHS embodiments, execution of instructions by the processor further causes the validation process to update the inventory certificate to identify the authorized hardware component as a hardware component validated by the user. In additional IHS embodiments, the inventory included in the inventory certificate further identifies a plurality of hardware components provided for installation in the IHS by a trusted entity. In additional IHS embodiments, the comparison further validates the detected hardware components of the IHS as the same hardware components installed during factory assembly of the IHS or as hardware components provided for installation in the IHS by a trusted entity.

Various additional embodiments provide computer-readable storage devices that store instructions for validating secure assembly and delivery of an IHS. Execution of the instructions by one or more processors of the IHS causes a validation process of the IHS to: delay booting of an operating system of the IHS until detected hardware components of the IHS are validated; retrieve an inventory certificate uploaded to the IHS during factory provisioning of the IHS, wherein the inventory certificate includes an inventory identifying a plurality of hardware components installed during factory assembly of the IHS; collect an inventory of the detected hardware components of the IHS; compare the collected inventory against the inventory from the inventory certificate in order to validate the detected hardware components of the IHS as the same hardware components installed during factory assembly of the IHS; and when the comparison validates the detected hardware components of the IHS, allow booting of the operating system of the IHS.

In additional storage device embodiments, when the comparison does not validate the detected hardware components of the IHS, execution of instructions by the processor further causes the validation process to notify a user of the IHS of the discrepancy between the plurality of detected hardware components of the IHS and the hardware components installed during factory assembly of the IHS. In additional storage device embodiments, execution of instructions by the processor further causes the validation process to allow the user to disable a hardware component of the IHS that is not validated. In additional storage device embodiments, execution of instructions by the processor further causes the validation process to allow the user to authorize use of a hardware component of the IHS that is not validated. In additional storage device embodiments, execution of instructions by the processor further causes the validation process to update the inventory certificate to identify the authorized hardware component as a hardware component validated by the user.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 8 is a flowchart describing certain steps of an additional method, according to some embodiments, for secure booting of an IHS based on validated hardware.

DETAILED DESCRIPTION

Figure 1:
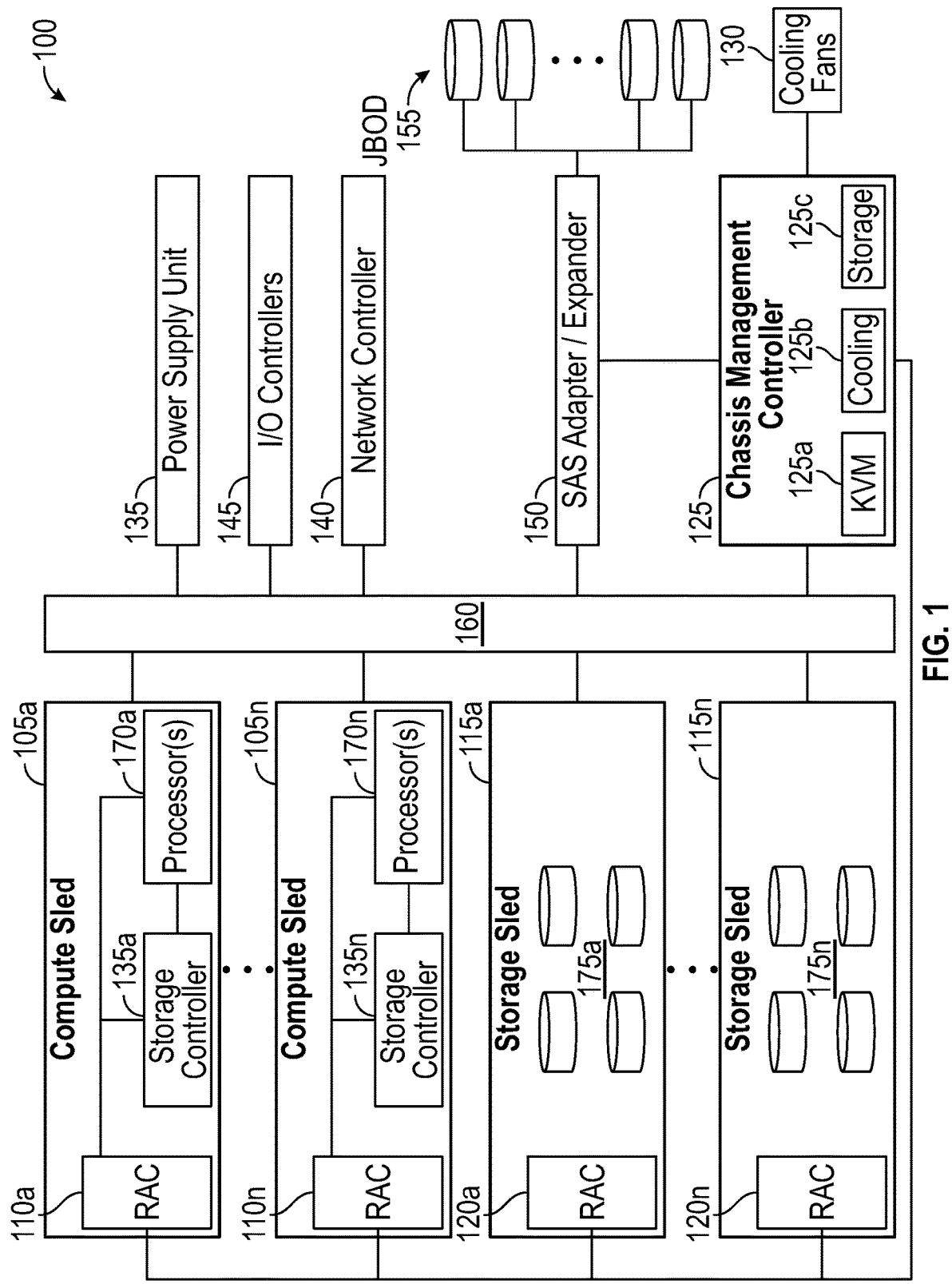
FIG. 1 is a diagram illustrating certain components of a chassis, according to some embodiments, for supporting secure booting of IHSs installed in the chassis based on validated hardware.

FIG. 1 is a block diagram illustrating certain components of a chassis 100 comprising one or more compute sleds 105a-n and one or more storage sleds 115a-n that may be configured to implement the systems and methods described herein for supporting secure booting of IHSs installed in the chassis 100 based on validation of the hardware of the IHSs. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery and deployment of an IHS, an IHS may be modified by replacing various hardware components of the IHS or by installing new hardware components to the IHS. As described in additional detail below, chassis 100 may include capabilities that allow a user to delay booting of an IHS installed in chassis 100 until validating that the detected hardware components of chassis 100 are either factory installed hardware components or are hardware components supplied for installation in the chassis 100 by a trusted entity.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100. In scenarios where backplane 160 is replaced, embodiments support validation that a replacement backplane installed by a customer in chassis 100 is the same backplane that was supplied to the customer.

Figure 2:
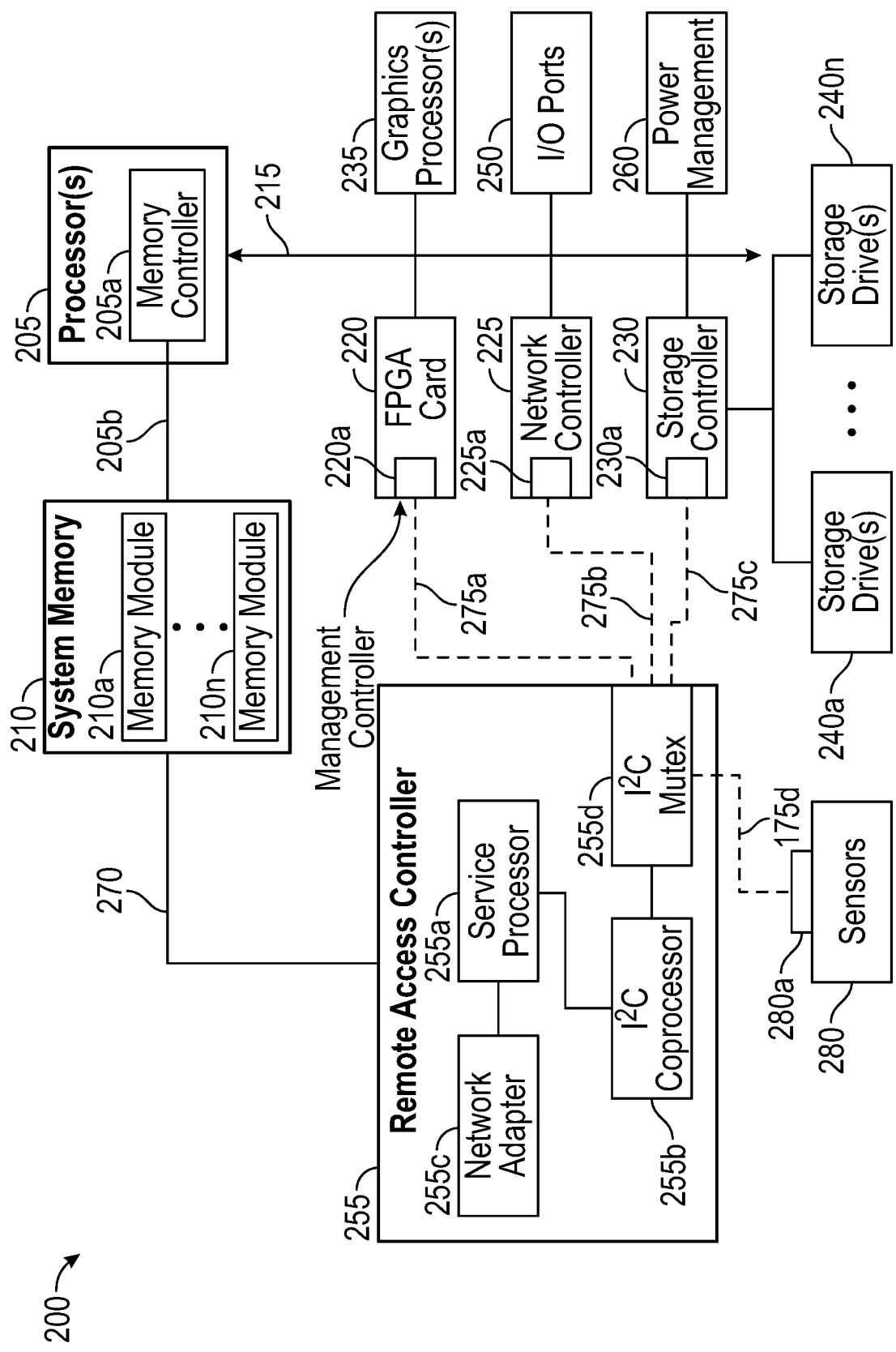
FIG. 2 is a diagram illustrating certain components of an IHS configured as a component of a chassis, according to some embodiments, for supporting secure booting of the IHS based on validated hardware.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

In some embodiments, each compute sled 105a-n installed in chassis 100 may be uniquely identified based on a code or other identifier that may be permanently encoded in a non-volatile memory of a respective compute sled 105a-n by its manufacturer. As described below, embodiments support validation of each compute sled 105a-n as being a compute sled that was installed at the factory during the manufacture of chassis 100. Also as described below, during a provisioning phase of the factory assembly of chassis 100, a signed certificate that specifies hardware components of chassis 100 that were installed during its manufacture may be stored in a non-volatile memory accessed by a remote access controller 110a-n of a compute sled 105a-n. Using this signed inventory certificate, a customer may validate that the hardware components of chassis 100 are the same components that were installed at the factory during its manufacture. In scenarios where hardware components of a chassis are replaced or new hardware components are added to the chassis, embodiments support validation that components installed by a customer in chassis 100 are the same components that were supplied to the customer.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 may be uniquely identified based on a code or other identifier that may be permanently encoded in a non-volatile memory of the SAS expander 150 by its manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100. In scenarios where SAS expander 150 or a storage drive 155 is replaced or a new SAS expander or storage drive is added to the chassis, embodiments support validation that a SAS expander and storage drives installed by a customer in chassis 100 are the same components that were supplied to the customer.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. As described below, embodiments support validation of each storage sled 115a-n as being a storage sled that was installed at the factory during the manufacture of chassis 100. In scenarios where a storage sled 115a-n is replaced or a new storage sled is being added to the chassis, embodiments support validation that a storage sled installed by a customer in chassis 100 is the same storage sled that was supplied to the customer.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100. In scenarios where network controller 140 is replaced, embodiments support validation that a replacement network controller installed by a customer in chassis 100 is the same network controller that was supplied to the customer.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100. In scenarios where power supply unit 135 is replaced or a new power supply unit is added to the chassis, embodiments support validation that a power supply unit installed by a customer in chassis 100 is the same power supply unit that was supplied to the customer.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. In scenarios where an I/O controller 140 is replaced or a new I/O controller is added to a chassis, embodiments support validation that an I/O controller installed by a customer in chassis 100 is the same I/O controller that was supplied to the customer.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100. In scenarios where chassis management controller 125 is replaced or a new chassis management controller is added, embodiments support validation that a chassis management controller installed by a customer in chassis 100 is the same chassis management controller that was supplied to the customer.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting secure booting of the IHS 200 based on validated hardware. It should be appreciated that although the embodiments described herein may describe an IHS that is a compute sled or similar computing component that may be deployed within the bays of a chassis, other embodiments may be implemented via other types of IHSs that may also support validation of the secure booting based on validated hardware. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to delay booting of IHS 200 until validating that the hardware components of IHS 200 are the same hardware components that were installed at the factory during its manufacture. In scenarios where hardware components of IHS 200 are replaced or new hardware components that are installed to IHS 200 by a customer, embodiments support delaying booting of IHS 200 until validating that hardware components installed by the customer in IHS 200 are the same components that were supplied to the customer by a trusted entity.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200. In some instances, the motherboard on which processor 205 is mounted may be replaced. In such scenarios, embodiments support validation that a replacement motherboard installed by a customer in IHS 200 is the same motherboard that is supplied to the customer. Also as described in additional detail below, IHS 200 may include capabilities that allow a user to delay booting of an IHS until validating that a motherboard of IHS 200 is the same motherboard that was installed in IHS 200 at the factory during its manufacture.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200. In scenarios where one or more memory modules 210a-n of IHS 200 are replaced or new memory modules are being added to IHS 200, embodiments support validation that memory modules installed by a customer in IHS 200 are the same memory modules that were supplied to the customer. Also as described in additional detail below, IHS 200 may include capabilities that allow a user to delay booting of an IHS until the memory modules 210a-n of IHS 200 that are detected can be validated as factory installed or as supplied by a trusted entity.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200. In scenarios where an FPGA card 220 of IHS 200 is replaced or a new FPGA card is added to the IHS 200, embodiments support validation that an FPGA card installed by a customer in IHS 200 is the same FPGA card that was supplied to the customer. Also as described in additional detail below, IHS 200 may include capabilities that allow a user to delay booting of an IHS until the FPGA card(s) 220 of IHS 200 that are detected can be validated as factory installed or as supplied by a trusted entity.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200. In scenarios where a network controller 225 of IHS 200 is replaced or a new network controller is added to IHS 200, embodiments support validation that network controller installed by a customer in IHS 200 is the same network controller that was supplied to the customer. Also as described in additional detail below, IHS 200 may include capabilities that allow a user to delay booting of an IHS until the network controller(s) 225 of IHS 200 that are detected can be validated as factory installed or as supplied by a trusted entity.

IHS 200 may include one or more storage controllers 230 that may be utilized to access storage drives 240a-n that are accessible via the chassis in which IHS 200 is installed. Storage controllers 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In some embodiments, storage drives 240a-n may also be accessed by other IHSs that are also installed within the same chassis as IHS 200. Although a single storage controller 230 is illustrated in FIG. 2, IHS 200 may include multiple storage controllers that may operate similarly to storage controller 230. In embodiments where storage drives 240a-n are hot-swappable devices that are received by bays of chassis, the storage drives 240a-n may be coupled to IHS 200 via couplings between the bays of the chassis and a midplane or backplane 245 of IHS 200. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations.

In some embodiments, storage controllers 230 and storage drives 240a-n may each be uniquely identified based on a code or other identifier that may be permanently encoded in a non-volatile memory of these devices by their respective manufacturers. As described below, embodiments support validation of storage controllers 230 and storage drives 240a-n as being the same components that were installed at the factory during the manufacture of IHS 200. In scenarios where a storage controllers 230 or a storage drive 240a-n of IHS 200 is replaced or a new storage controller or storage drive is added to IHS 200, embodiments support validation that components installed by a customer in IHS 200 are the same components that were supplied to the customer. Also as described in additional detail below, IHS 200 may include capabilities that allow a user to delay booting of an IHS until the storage controllers 230 and storage drives 240a-n of IHS 200 that are detected can be validated as factory installed or as supplied by a trusted entity.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200. In scenarios where these components of IHS 200 are replaced or new components are installed in IHS 200, embodiments support validation that components installed by a customer in IHS 200 are the same components that were supplied to the customer. Also as described in additional detail below, IHS 200 may include capabilities that allow a user to delay booting of an IHS until the various components of IHS 200 that are detected can be validated as factory installed or as supplied by a trusted entity.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200. In some embodiments, remote access controller 255 may be configured to implement the described hardware validation procedures that delay booting of the operating system of IHS 200 until the detected hardware of IHS may be validated as factory installed or as supplied by a trusted entity. In such embodiments, hardware components of IHS 200 such as processor 205, system memory 210, FPGA card 220, network controller 225, storage controller 230 and storage drives 240$a$-$n$ may remain in a low power states that support identification of these components via out-of-band connections with remote access controller, but are not fully initialized until the validation procedures of remote access controller 255 have confirmed that the detected hardware components of IHS 200 are validated as factory installed or as supplied by a trusted entity.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. In scenarios where remote access controller 255 of IHS 200 is replaced, embodiments support validation that replacement remote access controller installed by a customer in IHS 200 is the same remote access controller that was supplied to the customer. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200. Also as described below, in response to replacement of one or more hardware components of IHS 200 or to the addition of new hardware components to IHS 200, the remote access controller 255 may be configured to receive a new signed inventory certificate or an updated signed inventory certificate that may be used to validate that the hardware components installed by a customer are the same hardware components that were supplied to the customer. Also as described in additional detail below, IHS 200 may include capabilities that allow a user to delay booting of an IHS until the remote access controller 255 of IHS 200 that is detected can be validated as factory installed or as supplied by a trusted entity.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
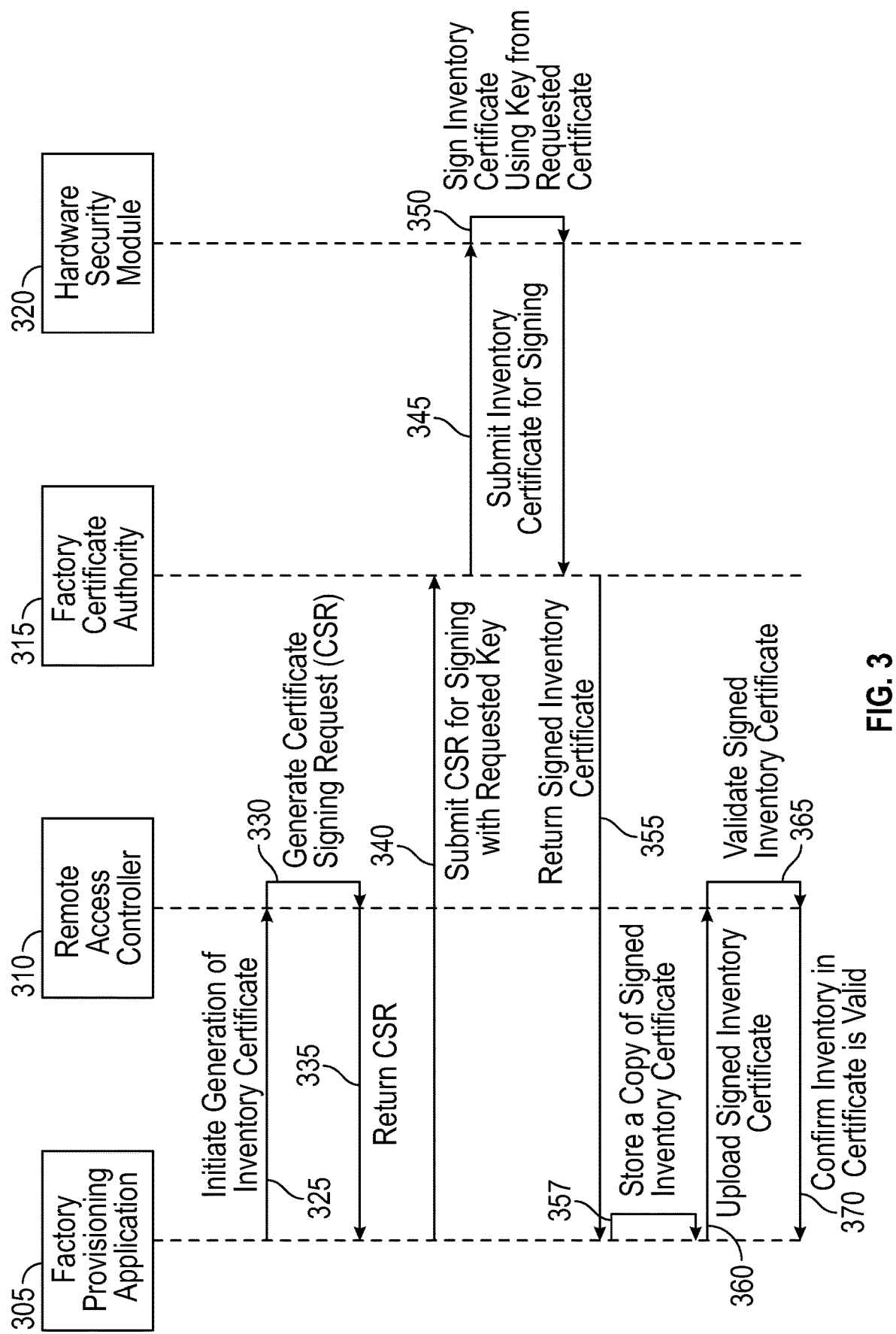
FIG. 3 is a swim lane diagram illustrating certain responsibilities of components of a system configured according to certain embodiments for factory provisioning of an IHS in a manner that supports secure booting of the IHS based on validated hardware.
Figure 4:
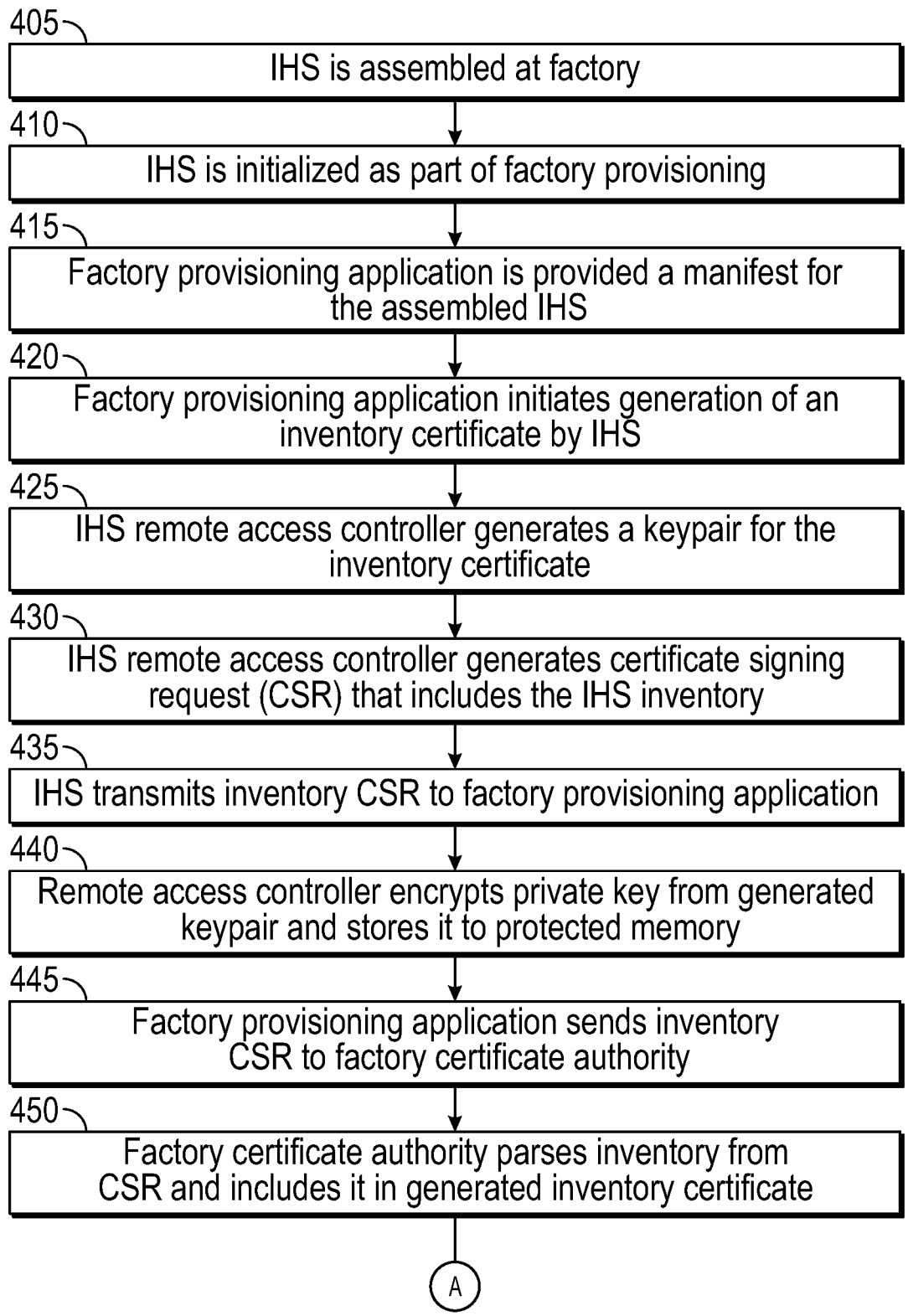
FIG. 4 is a flowchart describing certain steps of a method, according to some embodiments, for assembly and provisioning of an IHS in a manner that supports secure booting of the IHS based on validated hardware.
Figure 4:
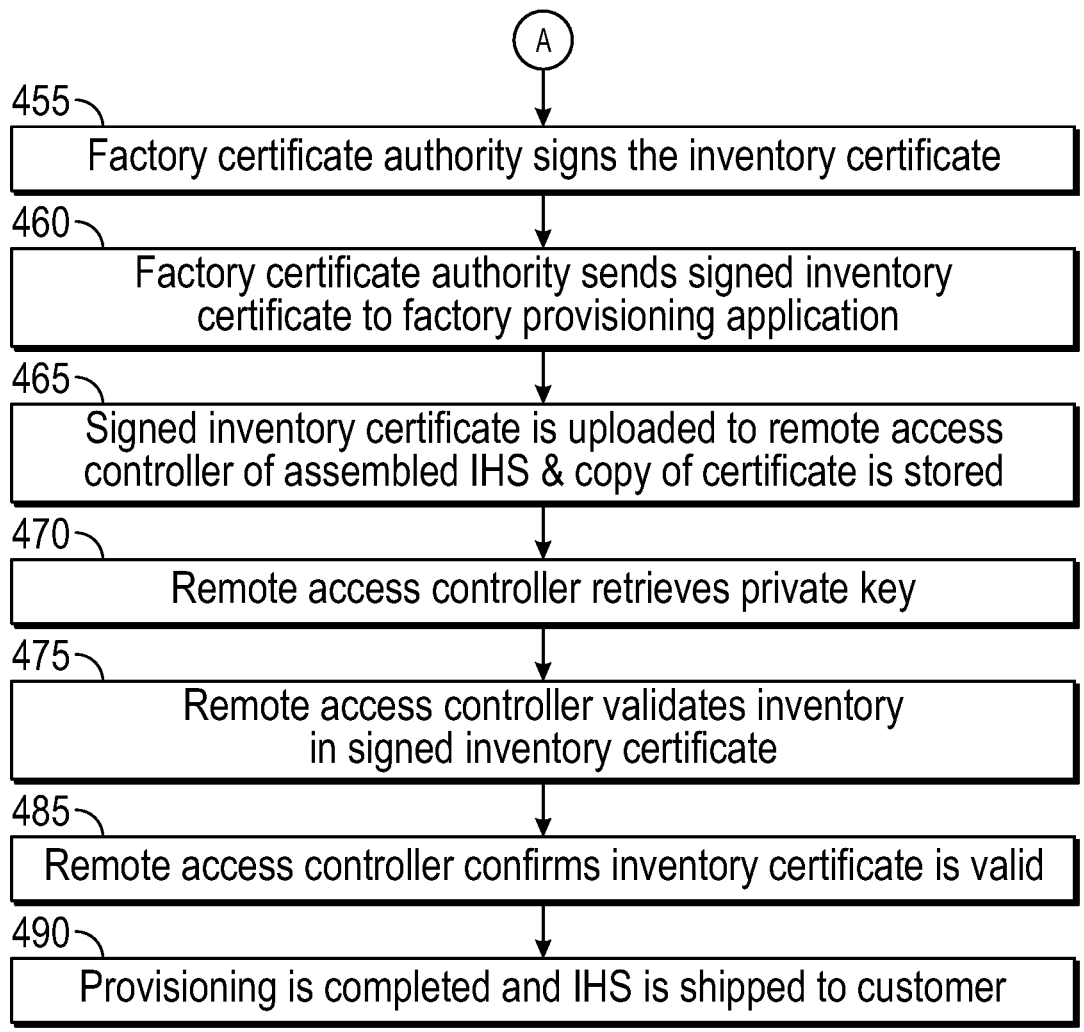

FIG. 3 is a swim lane diagram illustrating certain responsibilities of components of a system configured according to certain embodiments for factory provisioning of an IHS in a manner that supports secure booting of the IHS based on validated hardware. FIG. 4 is a flowchart describing certain steps of a method, according to some embodiments, for assembly and provisioning of an IHS in a manner that supports the secure booting of the IHS based on validated hardware. Some embodiments of the method of FIG. 4 may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 415, a manifest generated during assembly of an IHS is provided to the factory provisioning application that is being used to provision the assembled IHS. Based on this hardware manifest information, at block 420, the factory provisioning application may also initiate the generation of an inventory certificate that may be used to validate that the detected hardware components of the IHS are the same hardware components that were installed during the factory assembly of the IHS. As described in additional detail with regard to FIG. 7, once an IHS has been shipped to a customer, embodiments support the ability to validate any replacement hardware or new hardware installed by the customer against the inventory certificate in order to confirm that the hardware installed by the customer is the same hardware components supplied to the customer. As described with regard to FIG. 8, an IHS may include capabilities that allow a user to delay booting of the IHS until validating that the detected hardware components of the IHS are either factory installed hardware components or are hardware components supplied for installation in the IHS by a trusted entity.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS. The factory installed hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS. As described below, at a later time, this inventory certificate may be updated or replaced in response to replacement of one or more hardware components of the IHS, or in response to additional hardware components being installed in the IHS.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once the IHS has been shipped and has been deployed by a customer. As described below with regard to FIG. 7, using this stored copy of the signed inventory certificate, a trusted entity providing ongoing support of IHS may validate that an inventory of installed hardware reported by the IHS matches the factory installed hardware of the IHS. In addition, the trusted entity may utilize the stored inventory certificate to provide the IHS with a new or updated inventory certificate that reflects replacement and/or new hardware that was supplied for installation in the IHS. Using the inventory certificate that includes updated inventory information, an administrator may confirm that a hardware update corresponds to a genuine component that was supplied by the trusted entity.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the public key from the generated keypair, at block 475, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 485, the remote access controller confirms that the inventory included in the signed inventory certificate is valid and, at 370, the remote access controller 310 confirms the validity of the inventory certificate with a notification to the factory provisioning application 305. With the generation and validation of the signed inventory certificate completed, additional factory provisioning of the assembled IHS may be completed and, at block 490, the assembled IHS may be shipped from the factory to a customer.

Upon delivery of the IHS, embodiments provide a customer with the capability of validating that the delivered IHS includes only hardware components that were installed at the factory during manufacture of the IHS. Embodiments thus support an initial validation of the secure assembly and delivery of an IHS. However, once an IHS has been deployed, various components of the IHS may be replaced and new components may be installed to the IHS. Accordingly, upon modification of the components of an IHS, embodiments also provide a customer with the capability of validating that the hardware installed in the IHS at a later time is the same hardware that was supplied to the customer by a trusted entity.

Figure 5:
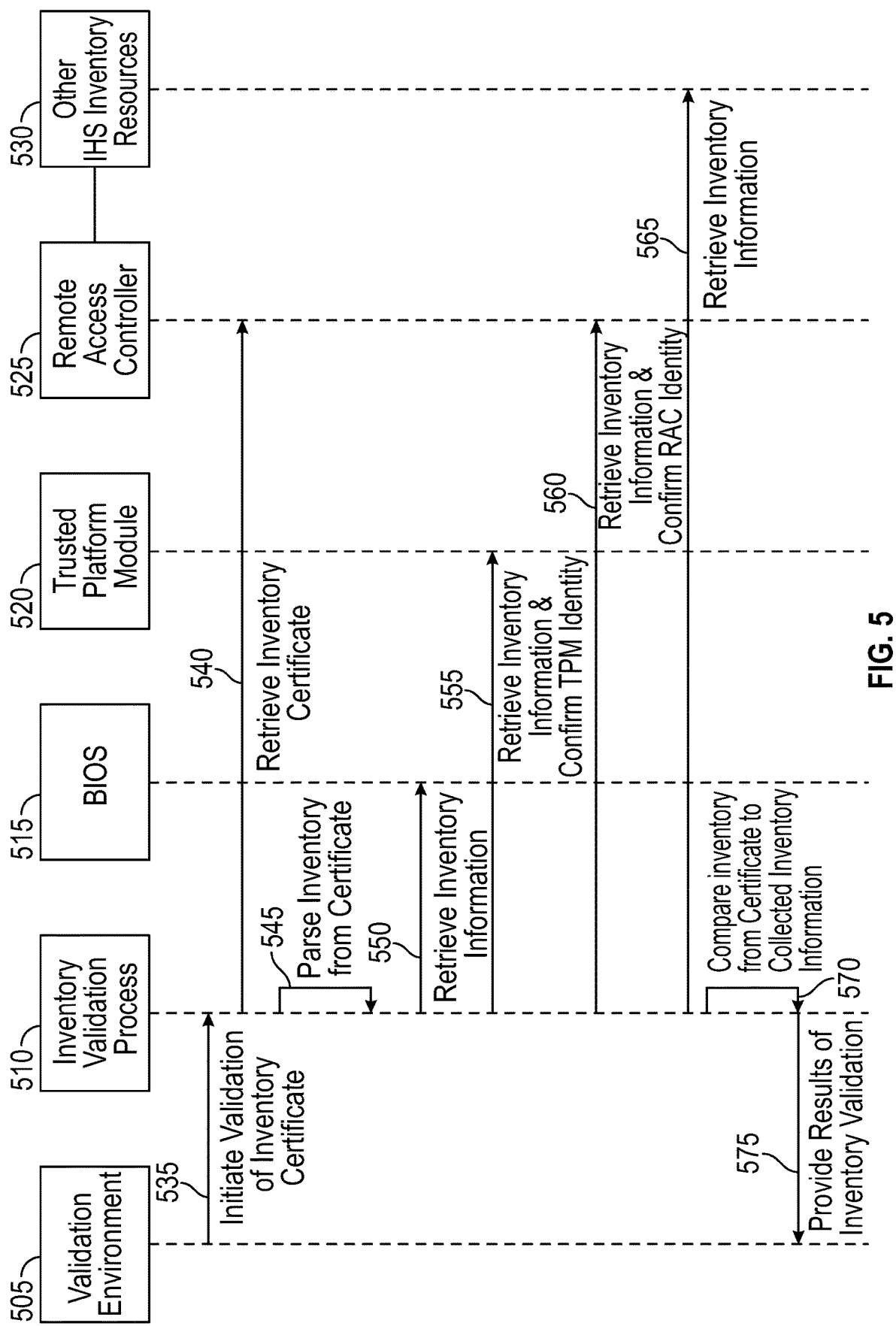
FIG. 5 is a swim lane diagram illustrating certain responsibilities of components of an IHS configured according to certain embodiments for secure booting of the IHS based on validated hardware.
Figure 6:
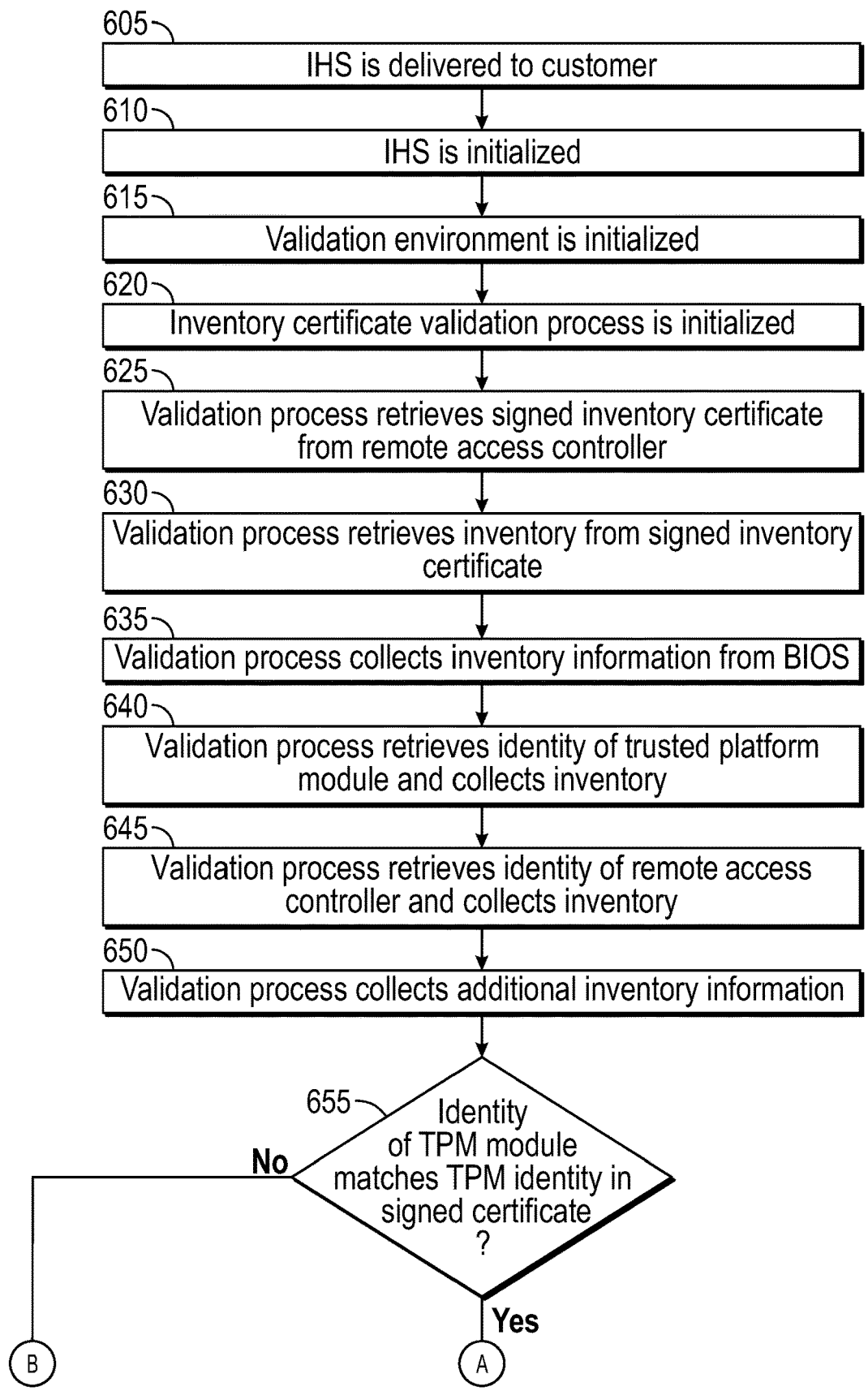
FIG. 6 is a flowchart describing certain steps of an additional method, according to some embodiments, for supporting secure booting of the IHS based on validated hardware.
Figure 6:
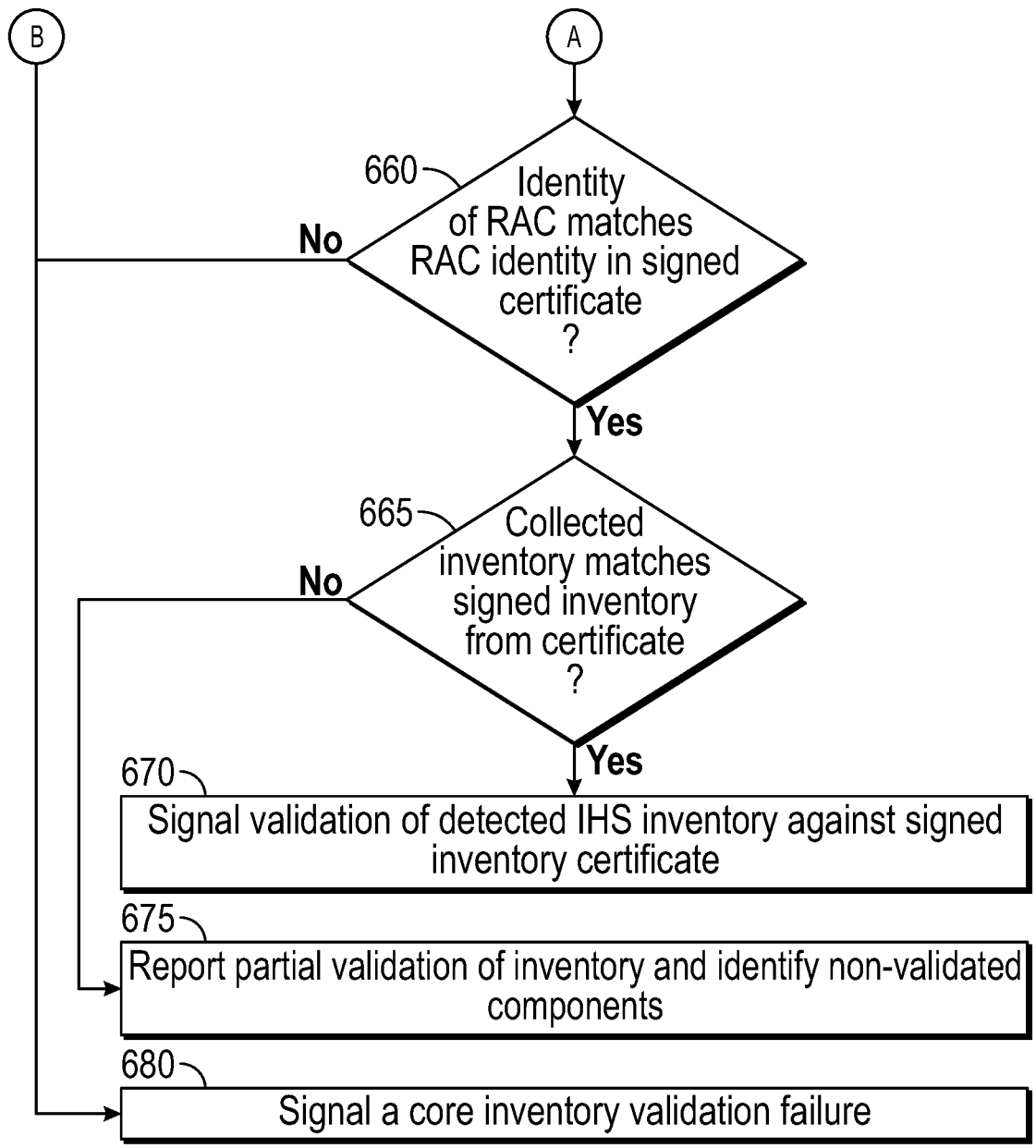

FIGS. 5 and 6 describe embodiments for use in an initial validation of an IHS as including only factory installed hardware components. Further below, FIG. 7 describes the validation of replacement and/or new components as factory installed or as supplied by a trusted entity. FIG. 8 describes capabilities that allow a user to delay booting of the IHS until validating that the detected hardware components of the IHS are either factory installed hardware components or are hardware components supplied for installation in the IHS by a trusted entity. Accordingly, FIG. 5 is a swim lane diagram illustrating certain responsibilities of components of an IHS configured according to certain embodiments for initial validation of the secure assembly and delivery of the IHS, in some cases, prior to booting the IHS. FIG. 6 is a flowchart describing certain steps of a method, according to some embodiments, for the initial validation of the secure assembly and delivery of an IHS, in some cases, prior to booting the IHS. Embodiments may begin, at block 605, with the delivery of an IHS to a customer, where the IHS has been assembled and provisioned according to the procedures set forth above. In particular, the delivered IHS has been provisioned at the factory to include a signed inventory certificate that specifies the factory installed hardware components of the IHS.

Upon receiving an IHS configured in this manner, at block 610, the IHS may be unpacked, assembled and initialized by an administrator. In some instances, an IHS may be ready for immediate deployment by a customer. In other instances, an IHS may require further provisioning by customer before it is deployed, such as for operation within a particular data center. As described with regard to FIG. 8, in some instances, an IHS may be provisioned by an administrator to delay booting of the IHS until the hardware of the IHS can be validated or otherwise approved by a user. As such, in various instances, an IHS may be unpacked, assembled and initialized in order to deploy the IHS or to prepare it for further provisioning. At block 615, the IHS has been powered and validation process is initialized. In some embodiments, validation process may run within a pre-boot environment, such as a PXE (Preboot eXecution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS. As described with regard to FIG. 8, if the IHS has been configured to delay booting until the hardware of the IHS is validated, a validation process operating in a pre-boot operating environment may report any validation failures to a user and may provide a user with various options for investigating and resolving any validation failures. Once the validation failures have been resolved, the validation process may then allow further booting of the IHS, such as booting of an operating system.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

At block 620 and as indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process may be added to the root of trust of the IHS. At block 625 and as indicated at 540, the inventory certificate validation process 510 retrieves the signed inventory certificate from the remote access controller 525 or from a persistent memory of the IHS. As described above, the factory provisioning process may include uploading the signed inventory certificate to the remote access controller or to a persistent memory of the IHS. At block 630 and as indicated at 545, the inventory certificate validation process 510 parses the hardware inventory information from the signed inventory certificate. Using the public key provided in the signed inventory certificate, the inventory validation process 510 may confirm the integrity of the inventory information that is included in the signed inventory certificate.

In some scenarios, the inventory certificate validation process 510 may commence by collecting an inventory of the detected hardware components of the IHS. In some instances, this collection of inventory information may be initiated earlier by the inventory certificate validation process, such as during initialization of the IHS. At block 635 and as indicated at 550, the inventory certificate validation process 510 may query the BIOS 515 of the IHS for an inventory of hardware components that have been detected by BIOS 515. At block 640 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 645 and as indicated at 560, the inventory certificate validation process 510 may retrieve additional hardware inventory information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. Also as with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 650 and as indicated at 565, the inventory certificate validation process 510 retrieves any additional inventory information from any other data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information against the inventory information that is parsed from the signed inventory certificate. Accordingly, at block 655, the inventory certificate validation process may confirm the identity of the detected TPM against the identity of the TPM reported in the signed inventory certificate. If the identity of the TPM is successfully validated, validation may continue at block 660. However, if the identity of the TPM is not validated, at block 680, the inventory certificate validation process may signal a core inventory validation failure since any discrepancies between the identity of the factory installed TPM and the TPM that has been detected in the initialized IHS signals a potential compromise in the root of trusted hardware components of the IHS.

At block 660, the inventory certificate validation process may confirm the identity of the detected remote access controller against the identity of the remote access controller reported in the signed inventory certificate. If the remote access controller is successfully validated, validation may continue at block 665. Otherwise, if the identity of the remote access controller is not validated, at block 680, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

At block 665, the inventory certificate validation process continues the comparison of the detected hardware components of the initialized IHS against the identities of the factory installed hardware components that are included in the signed inventory certificate. If the unique identifiers of the detected hardware components of the initialized IHS match the identifiers of the factory installed hardware components from the signed inventory certificate, at block 670, the inventory certificate validation process signals a successful validation of the detected hardware of the IHS. The customer receiving delivery of the IHS is thus assured that the IHS is operating using only hardware components that were installed at the factory during manufacture of the IHS.

If any discrepancies are detected between the detected hardware components of the initialized IHS and the hardware components reported in the signed inventory certificate, at block 675, a partial validation of the hardware inventory of the IHS may be reported. In some instances, such discrepancies may result from failure to detect hardware components that are specified in the signed inventory certificate. In some instances, such discrepancies may result from mismatched identity information between the detected hardware components and the components listed in the signed inventory certificate, such as discrepancies in the serial numbers or other unique identifiers associated with a hardware component. In other instances, such discrepancies may result from the detection of hardware components that are not present in the signed inventory certificate. As described in additional detail with regard to FIG. 8, any such discrepancies may prevent further booting of the IHS until the discrepancies are resolved. In such embodiments, any discrepancies may be reported to an administrator, thus allowing an administrator to investigate further and in some instances to choose to authorize booting of the IHS despite the identified discrepancies.

Figure 7:
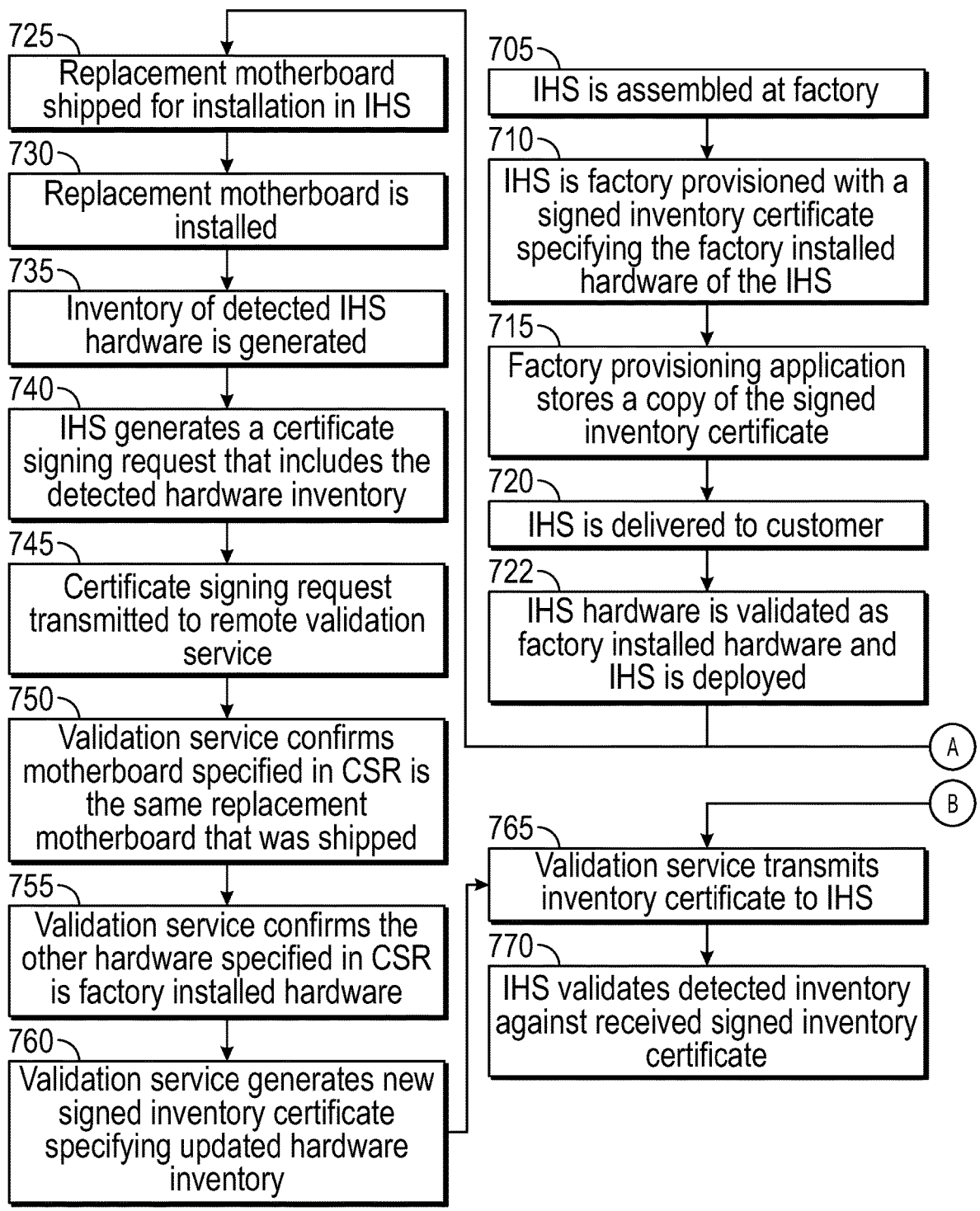
FIG. 7 is a flowchart describing certain steps of an additional method, according to some embodiments, for secure booting of an IHS based on validated hardware modifications.
Figure 7:
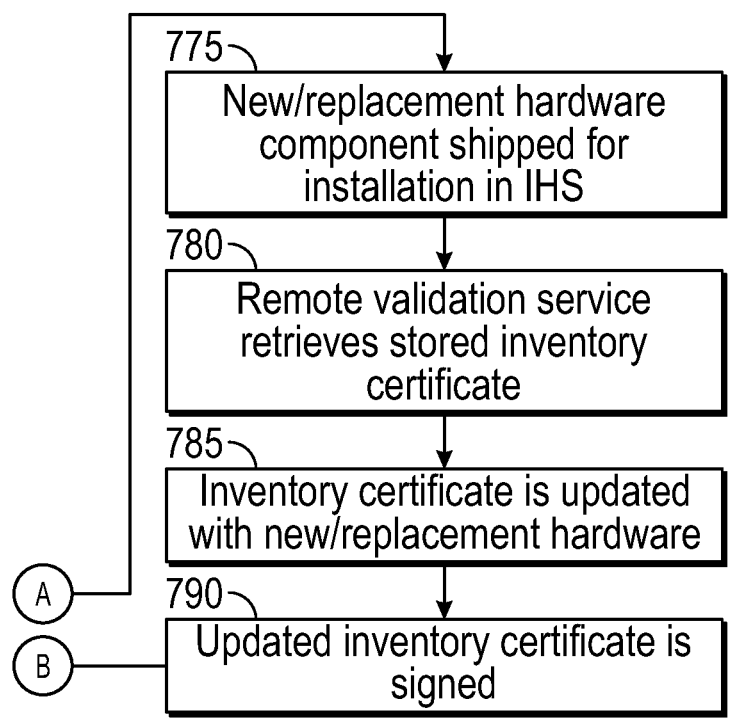

FIG. 7 is a flowchart describing certain steps of an additional method, according to some embodiments, for validating secure modifications to an IHS, in some cases, prior to booting the IHS. Embodiments may begin at block 705 with the factory assembly of an IHS, such as described with regard to FIGS. 3 and 4. Accordingly, the IHS is factory assembled to include various uniquely identifiable hardware components that may each be identified within a manifest that is generated as part of this factory assembly. At block 710, factory provisioning of the IHS generates a signed inventory certificate that specifies the factory installed hardware components of the IHS and is signed by a factory certificate authority, such as described above. Upon generation of the signed inventory certificate, the factory provisioning process may upload the certificate to a persistent memory of the IHS, such as via a remote access controller of the IHS. As described with regard to FIGS. 5 and 6, this inventory certificate may be used by a customer receiving delivery of the IHS to validate that the IHS is operating using only factory installed hardware components of the IHS. However, in many scenarios, once a new IHS has been validated and deployed by a customer, various modifications may be made to the IHS over time. For instance, hardware components of the IHS might be replaced due to component failures or to upgrade the capabilities of the IHS. In other instances, additional hardware components may be added to the IHS in order to expand its capabilities.

For use in validating that such modifications to the hardware components of an IHS are made using genuine hardware components that have been supplied by a trusted entity, at block 715, the factory provisioning application stores a copy of the signed inventory certificate that has been uploaded to the persistent memory of the IHS. Once the factory provisioning of the IHS has been completed, at block 720, the IHS is packaged and shipped to a customer. Upon receiving shipment of the IHS, at block 722 and as described with regard to FIGS. 5 and 6, the customer may validate that the detected hardware components of the IHS include only the factory installed hardware. Once the IHS has been confirmed to be operating using only validated hardware, the IHS may then be deployed. After some time, modifications may be made to the hardware components of the IHS.

Various types of modifications may be made to an IHS. One of such modifications is to replace a motherboard or backplane of an IHS to which processors and other core components of the IHS may be fixed. For instance, components such as a remote access controller, a TPM, and secure memory devices may be fixed to a motherboard of an IHS. As described above, such core components may be utilized to establish a root of trust that includes hardware components that are operating using validated instructions. Also as described above, embodiments may cryptographically bind a signed inventory certificate to components operating within this root of trust of an IHS. For instance, cryptographic capabilities of a remote access controller and/or a TPM may be used to digitally sign inventory information that is included in the signed inventory certificate. In scenarios that require replacement of a motherboard, backplane, daughter card or other circuit board of an IHS that includes one or more of such hardware components to which an inventory certificate is digitally bound, an existing inventory certificate that is bound to one of these components cannot be validated by the replacement board that will include different cryptographic components.

In such a scenario, at block 725, a replacement motherboard or other circuit board that includes components to which an inventory certificate is digitally bound is shipped to a customer for installation in an IHS, or is sold to a customer via a retail transaction. In various embodiments, the motherboard may be supplied by the manufacturer of the IHS, a retailer that sells replacement parts on behalf of the manufacturer or by a trusted third-party providing ongoing support of the IHS. At block 730, the replacement motherboard is received by the customer and is installed in the IHS. As described with regard to FIGS. 5 and 6, the IHS is initialized and an inventory of the detected hardware components of the IHS is generated. Now operating using the replacement motherboard, the validation process of the IHS queries the BIOS, remote access controller and/or TPM of this replacement motherboard in order to generate an inventory of detected hardware components that are operating in the IHS.

At block 740, the IHS generates a certificate signing request (CSR) that includes the detected hardware inventory of the IHS. In some embodiments, this CSR may be generated by the remote access controller of the IHS in the same manner as described with regard to the factory provisioning process of FIGS. 4 and 5, where the remote access controller utilizes its cryptographic capabilities to generate a key pair and includes the public key from this key pair in the CSR, thus binding the requested inventory certificate to this remote access controller and consequently to this replacement motherboard on which the remote access controller is mounted. At block 745, the CSR is transmitted to a remote validation service. In some embodiments, the hardware inventory and the CSR may be generated via a validation process that operates within the IHS root of trust. As described with regard to FIG. 8, in scenarios where a CSR is generated by a remote access controller in response to detection of a replacement motherboard, the remote access controller may transmit the CSR to a remote validation service without further booting of the IHS and, in particular, without booting the operating system of the IHS.

In some embodiments, the remote validation service receiving the CSR may be a service that is provided by the manufacturer of the IHS. In other embodiments, the remote validation service may be supported by a trusted third-party that has been contracted to provide ongoing support of the IHS and which has been granted access to data such as the factory installed hardware of the IHS and such as the identity of hardware components that have been supplied by trusted entities for installation in the IHS. At block 750, the validation service receives the CSR that is transmitted by the IHS. The validation service extracts the hardware inventory information included in the CSR and identifies the motherboard that is reported in this hardware inventory. The validation service compares the identity of this motherboard reported in the CSR against the identity of the motherboard that was supplied to the customer at step 725. If the identity of the reported motherboard matches the identity of the supplied motherboard, the customer may be assured that the installed motherboard is a genuine component that was supplied by a trusted entity and further booting of the IHS may be resumed. However, if the identity of the detected motherboard does not match the identity of the supplied motherboard, the validation service may signal a core validation failure and may notify the customer that the installed motherboard may be a compromised component.

If the identity of the replacement motherboard specified in the CSR is successfully validated, at block 755, the validation service may also validate the other detected hardware components of the IHS that are reported in the CSR. In some embodiments, the validation service may compare the hardware inventory information included in the CSR against the factory installed hardware inventory included in the inventory certificate that was stored, at block 715, during factory provisioning of the IHS. As described with regard to FIGS. 5 and 6, such a comparison may identify any detected hardware components reported by the IHS that are not factory installed components and may also identify any factory installed components that are not reported as operating by the IHS. Also as described with regard to FIG. 8, any detected discrepancies may cause further booting of the IHS to be halted until the discrepancies are resolved by an administrator.

If the hardware inventory information reported in the CSR is validated as including only factory installed hardware components and genuine new/replacement components that were supplied by trusted entity, at block 760, the validation service proceeds to generate a new signed inventory certificate that specifies the updated hardware inventory that was reported in the CSR. In some embodiments, the new signed inventory certificate that is generated by the validation service may be signed by a factory certificate authority that utilizes a hardware security module, such as described with regard to FIGS. 3 and 4. In some embodiments, the new signed inventory certificate may be signed by a different certificate authority that is utilized by the manufacturer of the IHS or by a trusted entity that is providing ongoing support of IHS.

At block 765, the remote validation service transmits the new signed inventory certificate to the IHS. In some embodiments, the remote access controller that generated the CSR may receive the new signed inventory certificate from the remote validation service. At block 770, the hardware inventory information included in the new signed inventory certificate may be validated by the validation process of the IHS as the same hardware inventory that was reported in the CSR. Upon successful validation of the hardware inventory, the remote access controller may store the new signed inventory certificate to a persistent memory for use in continued validation of the detected hardware components of the IHS during its ongoing use by the customer. For instance, the new inventory certificate may be periodically used to validate that the IHS continues to operate using only genuine hardware components supplied to the customer by a trusted entity and factory installed hardware components.

As indicated in FIG. 7, in some instances, hardware components may be supplied for installation in an IHS, where these hardware components do not operate within the root of trust of the IHS. For instance, a defective storage drive or a defective network controller of a server IHS may be replaced with new components. In other instances, additional storage drives may be added to an IHS in order to expand its storage capabilities. In other instances, a hardware component of an IHS, such as a storage controller, may be replaced in order to upgrade the storage capabilities of the IHS. In these instances, such types of components may be separate from the motherboard components of an IHS such that their replacement or addition does not affect the cryptographic binding of an inventory certificate to the IHS. Accordingly, the root of trust of an IHS is not affected by replacement or addition of such components.

At block 775, a new or replacement hardware component is supplied for installation in an IHS, where the hardware component does not alter the cryptographic binding of an inventory certificate to the IHS. In various embodiments, the hardware component may be shipped to a customer for installation in an IHS, or may be sold to a customer via a retail transaction. The component may be supplied by the manufacturer of the IHS, a retailer that sells replacement parts on behalf of the manufacturer or by a trusted third-party providing ongoing support of the IHS. The supplied hardware component is received by the customer and is installed in the IHS. Once the component is installed and the IHS is initialized, in some embodiments, the hardware component may be detected by a hardware validation process, such as described with regard to FIGS. 5 and 6, and may be identified as a hardware component that is not present in the hardware inventory of the signed inventory certificate that is stored locally by the IHS. As described in additional detail with regard to FIG. 8, further booting of the IHS may be halted and the user of the IHS may be notified of the non-validated hardware component, such that the user may be prompted to proceed while utilizing a non-validated component or to disable the component until it can be validated as a genuine components that was supplied by a trusted entity.

Upon a new/replacement hardware component being supplied for installation in an IHS, at block 780, a remote validation service retrieves the signed inventory certificate stored, at block 715, during factory provisioning of the IHS. At block 785, the validation service updates the inventory certificate of the IHS to include the identity of the supplied hardware component. The updated inventory certificate may be re-signed, at block 790, by the factory certificate authority or by another certificate authority operated by a trusted entity providing ongoing support of the IHS. Although the updated inventory certificate includes an updated inventory, the inventory certificate is still cryptographically bound to the root of trust of the IHS. The updated inventory certificate that has been re-signed may be transmitted, at block 765, to the IHS by the validation service. In various embodiments, the updated inventory certificate may be received by the remote access controller of the IHS or by a validation process running within the operating system of the IHS.

Upon receipt of the updated inventory certificate, at block 770, the IHS may initiate a validation process, such as described above, in order to compare the detected hardware inventory of the IHS against the inventory reported in the updated inventory certificate. If the detected hardware inventory of the IHS matches the inventory reported in the updated inventory certificate, the customer may be assured that the installed hardware component is a genuine component that was supplied by a trusted entity and further booting of the IHS may be resumed. However, if the new or replacement hardware component installed in the IHS is not identified in the inventory of the updated inventory certificate, the validation process may notify the user that the IHS may be operating with a compromised component that was not supplied by a trusted entity. In this manner, the customer may validate that any modifications made to the hardware of an IHS are made using genuine components provided by trusted entities.

FIG. 8 is a flowchart describing certain steps of an additional method, according to some embodiments, for secure booting of an IHS based on validated hardware. Embodiments may begin at 825 with a user 805 configuring boot settings for use with the described hardware validation process. As indicated in FIG. 8, such boot settings may be configured through settings provided by the BIOS 810 of the IHS. In other embodiments, boot setting configurations may be supported by a remote access controller of the IHS, such as by a hardware validation process operating on the remote access controller. In some embodiments, boot setting configurations may be supported via configurations provided by the operating system of an IHS. In some instances, a user 805 may configure boot settings during initial provisioning of an IHS prior to its deployment. In other instances, a user 805 may configure such boot settings at a later time after the IHS has been deployed.

As part of these boot setting configurations, a user 805 may specify whether to delay booting of operating system of an IHS until all of the detected hardware components of the IHS have been validated. Additionally, such boot setting configurations may specify whether to continue booting the operating system of an IHS while disabling any hardware components that are not properly validated against an inventory of genuine components maintained in an inventory certificate. Such boot settings may also specify whether to allow a user to authorize continued use of a hardware component that has not been properly validated.

At 830, a hardware validation process 815 of the IHS is initiated. As described with regard to FIGS. 5-7, a hardware validation process may be initiated on an IHS as part of a pre-boot validation that may be conducted upon each power cycle of an IHS. In some instances, the hardware validation process may be initiated upon the installation of new and/or replacement hardware components to the IHS. At 835, the validation process 815 queries the BIOS 810 for the boot configuration settings that have been specified by the user 805 for this IHS. As described, such boot configuration settings may specify how to handle any discrepancies identified by the hardware validation process 815. At 840, the hardware validation process 815 collects an inventory of detected hardware components of the IHS, such as described with regard to FIGS. 5-6. This inventory of detected hardware components may then be compared against the inventory information included in the inventory certificate maintained by the IHS.

In some scenarios and as described with regard to FIG. 7, the replacement of certain hardware components of an IHS, such as a motherboard or backplane, may require a new hardware inventory certificate that is generated by a remote validation service 820 and is transmitted to the IHS, as indicated at 845. In other scenarios and also as described with regard to FIG. 7, the supplying of a new or replacement hardware component for installation in an IHS may trigger the remote validation service 820 to generate an updated inventory certificate that is also transmitted to the IHS, also as indicated at 845. The inventory certificate maintained by the IHS may thus be an original inventory certificate that includes only an inventory of factory installed hardware components or may be a new/updated inventory certificate that includes an inventory of factory installed hardware components and also includes modifications to the factory installed hardware. Accordingly, the validation process may compare the detected hardware components of an IHS against an inventory certificate that specifies factory installed hardware of the IHS and may also specify hardware components supplied by a trusted entity for installation in the IHS.

At 850, the validation process 815 compares the detected hardware components of the IHS against the hardware inventory provided within the inventory certificate maintained by the IHS. Based on this comparison, at 855, discrepancies between the detected hardware and the genuine hardware from the inventory certificate are identified. As indicated in FIG. 8, a notification of any such discrepancies is provided to the user 805. Also as indicated in FIG. 8, the validation process 815 may halt further booting of the IHS in response to the detected discrepancies and in particular may prevent booting of the operating system of the IHS. In some embodiments, the validation process 815 may be implemented via operations of a remote access controller that may operate while collecting data from managed components via out-of-band connections such that all or some of the managed components may remain in low power states while further booting is being halted. The validation process 815 may determine whether to halt further booting of the IHS based on the user's 805 boot configuration settings that were retrieved at 835. If further booting of the IHS has been halted, the validation process 815 may continue to operate and may provide the user 815 with an interface that provides notification of the identified discrepancies and may provide the user with various options for resolving each identified discrepancy.

Via this user interface provided by the validation process 815, at 865, the user 805 may determine whether to proceed to boot the IHS, in some cases while using the non-validated hardware components. Embodiments may also allow the user 805 to choose to disable any non-validated hardware components and to continue booting of the IHS using only the hardware components that were successfully validated. In some instances, this option may not be made available to the user, such as in instances where the IHS cannot continue booting without use of the non-validated hardware component. For instance, when the non-validated hardware component is the motherboard or baseboard of an IHS, disabling of such components prevents any further booting of the IHS.

Embodiments may also allow the user 805 to choose to continue booting of the IHS while using the non-validated hardware component. Accordingly, embodiments may provide the user 805 with an option to authorize use of a non-validated hardware component. In a scenario where the user 805 has selected this option, at 870, the hardware validation process 815 receives the notification that the user 805 has authorized use of the non-validated hardware component. In such instances, the IHS may continue booting using the non-validated hardware component. In response to the user's authorization, at 875, the validation process 815 may update the inventory certificate to reflect the user's authorization for use of the non-validated hardware component. In such instances, the inventory provided in the inventory certificate may then specify factory installed hardware components, new/replacement hardware components supplied by a trusted entity and hardware components authorized for use by the user 805. This inventory certificate updated with user-authorized components may be used in future hardware validations by the validation process, where the identification of a user-authorized components in the inventory certificate serves as validation of the component.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for validating secure assembly and delivery of an IHS (Information Handling System), the method comprising:
   during factory-provisioning of the IHS:
      generating, by a remote access controller of the IHS, a first certificate signing request (CSR) that identifies an inventory of factory-installed hardware components of the first IHS;
      transmitting, by the remote access controller of the IHS, the first CSR to a factory certificate authority;
      uploading an inventory certificate generated by the factory certificate authority from the CSR to the IHS; and
   upon delivery of the IHS:
      initializing a validation process of the IHS, wherein the validation process delays further booting of the IHS until detected hardware components of the IHS are validated;
      retrieving, by the validation process, the inventory certificate uploaded to the IHS during factory provisioning of the IHS, wherein the inventory certificate includes an inventory identifying a plurality of hardware components installed during factory assembly of the IHS;
      collecting, by the validation process, an inventory of the detected hardware components of the IHS;
      comparing the collected inventory of detected hardware components against the inventory from the inventory certificate in order to validate the detected hardware components of the IHS as the same hardware components installed during factory assembly of the IHS; and
      when the comparison validates the detected hardware components of the IHS, allowing further booting of the IHS.

2. The method of claim 1, further comprising, when the comparison does not validate the detected hardware components of the IHS, notifying a user of the IHS of the discrepancy between the detected hardware components of the IHS and the hardware components installed during factory assembly of the IHS.

3. The method of claim 2, further comprising, allowing the user to disable a detected hardware component of the IHS that is not validated.

4. The method of claim 2, further comprising, allowing the user to authorize use of a detected hardware components of the IHS that is not validated.

5. The method of claim 4, further comprising, updating the inventory certificate to identify the authorized hardware components as a hardware component validated by the user.

6. The method of claim 1, wherein the inventory included in the inventory certificate further identifies a plurality of hardware components provided for installation in the IHS by a trusted entity.

7. The method of claim 6, wherein the comparison further validates the detected hardware components of the IHS as the same hardware components installed during factory assembly of the IHS or as hardware components provided for installation in the IHS by a trusted entity.

8. The method of claim 1, wherein the inventory certificate is uploaded to a persistent memory of the IHS by that is accessible by the remote access controller of the IHS.

9. An IHS (Information Handling System) comprising:
   a plurality of hardware components comprising:
      one or more processors; and
      one or more memory devices coupled to the processors, the memory devices storing computer-readable instructions that, upon execution by the processors, cause a factory provisioning process to:
  generate, by a remote access controller of the IHS, a first certificate signing request (CSR) that identifies an inventory of factory-installed hardware components of the first IHS;
  transmit, by the remote access controller of the IHS, the first CSR to a factory certificate authority;
  upload an inventory certificate generated by the factory certificate authority from the CSR to the IHS; and
and, upon delivery of the IHS, further cause a validation process of the IHS to:
  delay booting of an operating system of the IHS until the plurality of hardware components of the IHS are validated;
  compare the plurality of hardware components against the inventory from the inventory certificate in order to validate the plurality of hardware components of the IHS as the same hardware components installed during factory assembly of the IHS; and
  when the comparison validates the plurality of hardware components of the IHS, allow further booting of the operating system of the IHS.

10. The IHS of claim 9, wherein the execution of instructions by the processor further causes the validation process to: when the comparison does not validate the detected hardware components of the IHS, notify a user of the IHS of the discrepancy between the plurality of hardware components of the IHS and the hardware components installed during factory assembly of the IHS.

11. The IHS of claim 10, wherein the execution of instructions by the processor further causes the validation process to allow the user to disable a hardware component of the IHS that is not validated.

12. The IHS of claim 10, wherein the execution of instructions by the processor further causes the validation process to allow the user to authorize use of a hardware component of the IHS that is not validated.

13. The IHS of claim 12, wherein the execution of instructions by the processor further causes the validation process to update the inventory certificate to identify the authorized hardware component as a hardware component validated by the user.

14. The IHS of claim 9, wherein the inventory included in the inventory certificate further identifies a plurality of hardware components provided for installation in the IHS by a trusted entity.

15. The IHS of claim 14, wherein the comparison further validates the detected hardware components of the IHS as the same hardware components installed during factory assembly of the IHS or as hardware components provided for installation in the IHS by a trusted entity.

16. A non-transitory computer-readable storage device having instructions stored thereon for validating secure assembly and delivery of an IHS (Information Handling System), wherein execution of the instructions by one or more processors of the IHS causes a factory provisioning process of the IHS to:
  generate, by a remote access controller of the IHS, a first certificate signing request (CSR) that identifies an inventory of factory-installed hardware components of the first IHS;
  transmit, by the remote access controller of the IHS, the first CSR to a factory certificate authority;
  upload an inventory certificate generated by the factory certificate authority from the CSR to the IHS; and
and, upon delivery of the IHS, further cause a validation process of the IHS to:
  delay booting of an operating system of the IHS until detected hardware components of the IHS are validated;
  retrieve an inventory certificate uploaded to the IHS during factory provisioning of the IHS, wherein the inventory certificate includes an inventory identifying a plurality of hardware components installed during factory assembly of the IHS;
  collect an inventory of the detected hardware components of the IHS;
  compare the collected inventory against the inventory from the inventory certificate in order to validate the detected hardware components of the IHS as the same hardware components installed during factory assembly of the IHS; and
  when the comparison validates the detected hardware components of the IHS, allow booting of the operating system of the IHS.

17. The non-transitory storage device of claim 16, wherein the execution of instructions by the processor further causes the validation process to: when the comparison does not validate the detected hardware components of the IHS, notify a user of the IHS of the discrepancy between the plurality of detected hardware components of the IHS and the hardware components installed during factory assembly of the IHS.

18. The non-transitory storage device of claim 17, wherein the execution of instructions by the processor further causes the validation process to allow the user to disable a hardware component of the IHS that is not validated.

19. The non-transitory storage device of claim 17, wherein the execution of instructions by the processor further causes the validation process to allow the user to authorize use of a hardware component of the IHS that is not validated.

20. The non-transitory storage device of claim 19, wherein the execution of instructions by the processor further causes the validation process to update the inventory certificate to identify the authorized hardware component as a hardware component validated by the user.

* * * * *